US011652350B2

(12) United States Patent
Stadler et al.

(10) Patent No.: US 11,652,350 B2
(45) Date of Patent: May 16, 2023

(54) APPARATUS AND METHOD FOR CONTROLLING COMPONENTS IN A GRID BRANCH

(71) Applicant: Technische Hochschule Koeln, Cologne (DE)

(72) Inventors: Ingo Stadler, Bergheim (DE); Eberhard Waffenschmidt, Aachen (DE)

(73) Assignee: Technische Hochschule Koeln, Cologne (DE)

( * ) Notice: Subject to any disclaimer, the term of this patent is extended or adjusted under 35 U.S.C. 154(b) by 0 days.

(21) Appl. No.: 17/429,417

(22) PCT Filed: Feb. 10, 2020

(86) PCT No.: PCT/DE2020/100085
§ 371 (c)(1),
(2) Date: Aug. 9, 2021

(87) PCT Pub. No.: WO2020/164663
PCT Pub. Date: Aug. 20, 2020

(65) Prior Publication Data
US 2021/0384734 A1    Dec. 9, 2021

(30) Foreign Application Priority Data
Feb. 11, 2019  (DE) .................. 10 2019 103 234.2

(51) Int. Cl.
*H02J 3/38*  (2006.01)
*H02J 3/46*  (2006.01)
(52) U.S. Cl.
CPC .............. *H02J 3/381* (2013.01); *H02J 3/388* (2020.01); *H02J 3/46* (2013.01)

(58) Field of Classification Search
CPC .... H02J 3/381; H02J 3/388; H02J 3/46; H02J 3/14; Y02B 70/3225; Y02T 10/70; Y02T 10/7072; Y02T 90/12; Y04S 20/222
See application file for complete search history.

(56) References Cited

U.S. PATENT DOCUMENTS

| 5,191,520 A * | 3/1993 | Eckersley ................. H02J 1/08 363/72 |
| 2009/0115427 A1 | 5/2009 | Radtke et al. |
| 2016/0056633 A1 | 2/2016 | Benesch et al. |

FOREIGN PATENT DOCUMENTS

| DE | 102013205427 A1 | 10/2014 |
| DE | 102013217743 A1 | 3/2015 |

(Continued)

OTHER PUBLICATIONS

International Search Report dated Jul. 22, 2020, in International Application No. PCT/DE2020/100085.
(Continued)

*Primary Examiner* — Toan T Vu
(74) *Attorney, Agent, or Firm* — Patent Central LLC; Stephan A. Pendorf

(57) ABSTRACT

An apparatus for controlling components in a grid branch of an electrical power supply grid having a grid branch control unit for limiting a load in the grid branch, containing a grid state determination device, by means of which at least one physical parameter denoting a grid state of the grid branch is determinable, a control device for generating a control signal, by means of which an electric current between the grid branch and a component connected to a connection point thereof is influencable on the basis of the grid state, wherein the components have associated communication means for sending and/or receiving data and the control device of at least one of the components evaluates the determined parameters of the multiple components and takes (Continued)

Figure 1:
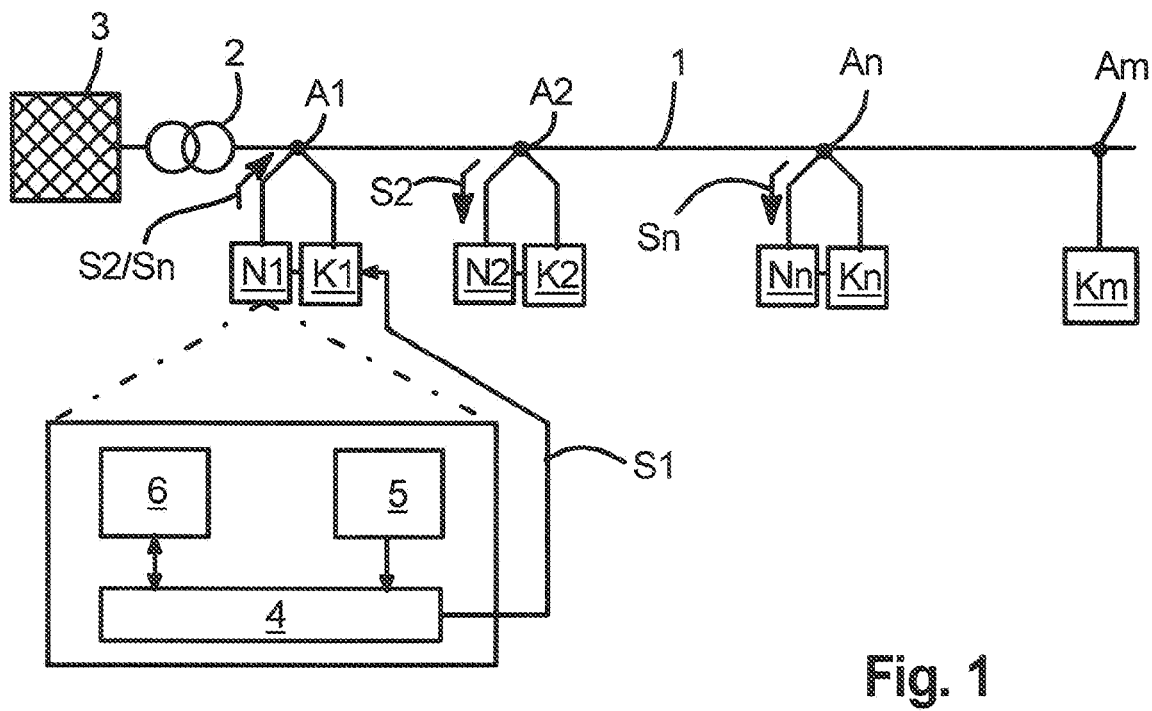

the evaluation result as a basis for generating the control signals of the associated components of the same grid branch.

10 Claims, 2 Drawing Sheets

(56) References Cited

FOREIGN PATENT DOCUMENTS

| | | |
|---|---|---|
| DE | 102014216020 A1 | 2/2016 |
| DE | 202016006211 U1 | 12/2017 |

OTHER PUBLICATIONS

International Preliminary Report on Patentability dated Aug. 26, 2021, in International Application No. PCT/DE2020/100085.

* cited by examiner

APPARATUS AND METHOD FOR CONTROLLING COMPONENTS IN A GRID BRANCH

The invention relates to an apparatus for controlling components in a grid branch of an electrical power grid having a grid branch control unit for limiting a load in the grid branch, containing a grid status determination device, by means of which at least one physical parameter characterizing a grid status of the grid branch can be determined, and a control device for generating a control signal, by means of which an electrical current between the grid branch and a component connected to a connection point of said grid branch can be influenced on the basis of the grid status.

Furthermore, the invention relates to a method for controlling components in a grid branch of an electrical power grid, wherein measured values identifying a load on the grid branch are determined, and a control signal for adjusting power consumption or power output of the component connected to the grid branch is generated.

DE 20 2016 006 211 U1 discloses a measurement assembly for spectrally resolved measurement of the impedance of power grids, which provides for the use of opto-triacs. A structural coupling to components arranged in the grid, such as supplies and loads, is not provided.

DE 10 2014 216 020 A1 discloses an apparatus for controlling loads, specifically an electrical energy store of a motor vehicle, said apparatus having a charger, by means of which a charging current from the energy store can be reduced on the basis of a determined grid impedance. The apparatus comprises a grid status determination device, by means of which the grid impedance can be determined by measuring voltage values at different charging currents.

DE 10 2013 217 743 A1 discloses an apparatus for controlling components in a grid branch of an electrical power grid, said apparatus providing a grid branch control unit for limiting a load in the grid branch. The grid branch control unit comprises a grid status determination device, by means of which measured values or physical parameters can be determined, from which a grid status of the grid branch can be derived. Furthermore, the grid branch control unit comprises a control device for generating a control signal, by means of which a charging or supply current of a component connected to a connection point of the grid branch can be influenced. The known apparatus enables allow the current of the component connected to the grid branch to be controlled on the basis of the load on the grid branch. Coordinated current control of a plurality of components connected to the same grid branch is not provided.

It is therefore an object of the present invention to provide an apparatus and a method for controlling components in a grid branch so as to optimize the charging and/or supply power of a plurality of components connected to the same grid branch.

To achieve this object, the invention is, in conjunction with the preamble of Claim 1, characterized in that the components are assigned communication means for transmitting and/or receiving data, and in that the control device of at least one of the components evaluates the determined parameters of the plurality of components and, on the basis of the evaluation result, generates the control signals for the assigned components of the same grid branch.

The advantage of the invention is that it is possible to control the charging of and/or supply from components of a grid branch in a coordinated manner. The components can be supplies or loads, which can each be controlled by a preferably integrated grid branch control unit assigned thereto.

In particular, the apparatus according to the invention allows optimum charging of multiple loads connected to the same grid branch. The basic concept of the invention is to allow the loads to be charging optimally (charging current, charging time) from a grid perspective. For example, if the loads are electric vehicles, the simultaneity factor decreases at high charging power, such that the summary grid load increases only marginally. Thus, for example, depending on the grid load in the grid branch, an electric vehicle can be charged for a shorter time at high charging power so as to free up the grid line more quickly for charging other electric vehicles. The invention thus gives a customer a relatively high charging power for the electric vehicle if not too many electric vehicles are simultaneously connected to the grid branch and also require charging power. In this respect, the invention allows optimum control of the charging current to, or supply current from, the components connected to the same grid branch via different connection points. The invention allows an existing grid capacity to be optimally utilized in order to provide the highest possible charging power for the loads in the grid branch. Account is also taken of components being connected to the grid branch that do not have a grid branch control unit.

According to a preferred embodiment of the invention, the charging or supply power in the grid branch is controlled in a decentralized manner. Since the grid branch control units assigned to respective components can communicate with one another, one of the grid branch control units is designated as a master grid branch control unit in accordance with certain criteria, while the other grid branch control units are designated as slave grid branch control units. The purpose of the master grid branch control unit is to determine and evaluate parameters or measurement results and to generate, from the evaluation result, a control signal for driving both the component directly connected to the master grid branch control unit and the components respectively connected to the slave grid branch control units. The master grid branch control units and the slave grid branch control units are configured to combine with one another via corresponding communication interfaces, i.e. to transmit and/or receive measured values. The prioritization of the master grid branch control unit has the effect that the measurement data required for the generation of the control signals is collected, assessed and evaluated in the master grid branch control unit and the relevant control signals are generated therefrom.

According to a further development of the invention, the grid status determination device for determining a grid impedance comprises a grid impedance determination device, which provides for the taking of two voltage measurements at different known load values at the same connection point. The grid impedance can be easily calculated from the two voltage measurements.

According to a further development of the invention, the grid impedance determination device is configured to determine an absolute grid impedance. For this purpose, the grid impedance is measured for a predetermined period of time, e.g. 24 hours. The highest occurring value is taken as a reference value for the lowest load in the grid branch. For other measurements, the reference value is then considered to be parallel to the actual load impedance. Since the load impedance can be considered to be in parallel with the reference value, the load impedance is determined from the measured load value and the reference load value. By means of the load impedance, the load on the power grid or the grid impedance can then be determined.

According to a further development of the invention, a grid status determination device has a voltage angle determination device, which is configured to determine the phase angle between the grid voltage and the voltage of the component at the connection point. Advantageously, this allows abrupt load changes in the grid branch to be detected, which can be taken into account in the evaluation for determining the control signal.

According to a further development of the invention, the grid status determination device has a grid load device, which allows grid loads at different connection points to be determined. For this purpose, measurement data from the components connected at different connection points or from the grid status determination devices are used. In an initialization phase, the line impedance between two connection points is determined. In the subsequent operating phase, the grid load, i.e. the grid current, is determined while taking into account the line impedance.

According to a further development of the invention, the communication means via which the grid branch control units communicate with one another have authentication means to allow communication partners to check and/or confirm the authenticity of one another.

To achieve the object, the method according to the invention is, in conjunction with the preamble of Claim 10, characterized in that measured values are transmitted and/or received between a number of components in the same grid branch, the measured values are evaluated, and then the control signals intended for driving the plurality of components are generated in accordance with a grid branch optimization rule and transmitted to the components.

According to the method according to the invention, the grid branch status is checked at a plurality of connection points of different components (loads and/or supplies), and control signals for the components in the same grid branch are determined in accordance with a grid branch optimization rule and are transmitted to the respective grid branch control units of the components or directly to the components. By means of the control signals, which can be, for example, charging and/or supply power values, the components are driven so as to satisfy charging or supply requirements of the respective components and to prevent an overload of the grid branch. Advantageously, the existing grid capacity in the grid branch can be optimally utilized in order to provide the highest possible charging power for the components.

According to a further development of the method according to the invention, the control signals are determined in only one grid branch control unit assigned to a single component. The charging/supply power in the grid branch is thus optimized in a self-organizing or decentralized network. The amount of equipment required is therefore low.

Further advantages of the invention will be apparent from the further dependent claims.

Exemplary embodiments of the invention will be described below in more detail with reference to the drawings.

Figure 2:
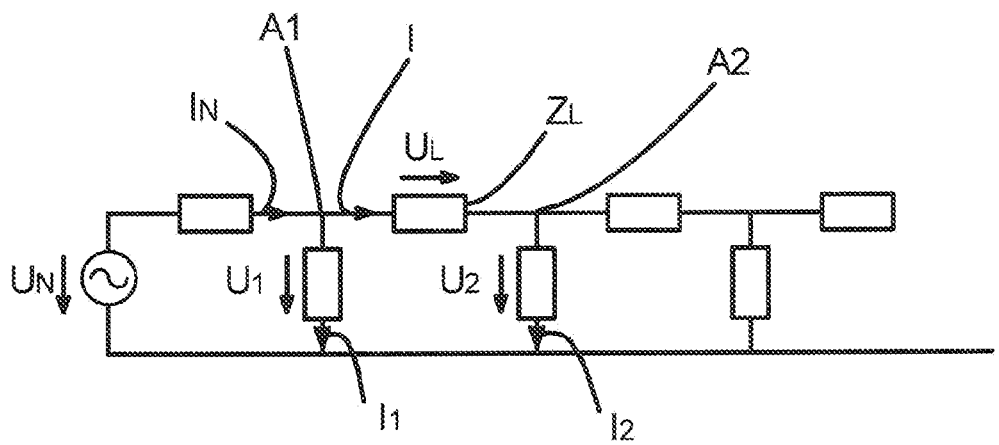
Figure 3:
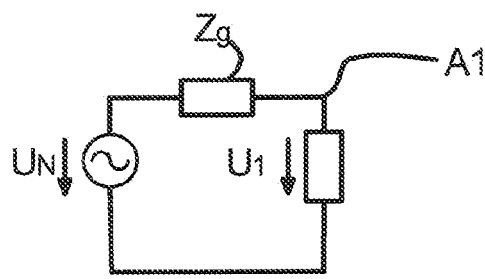
Figure 4:
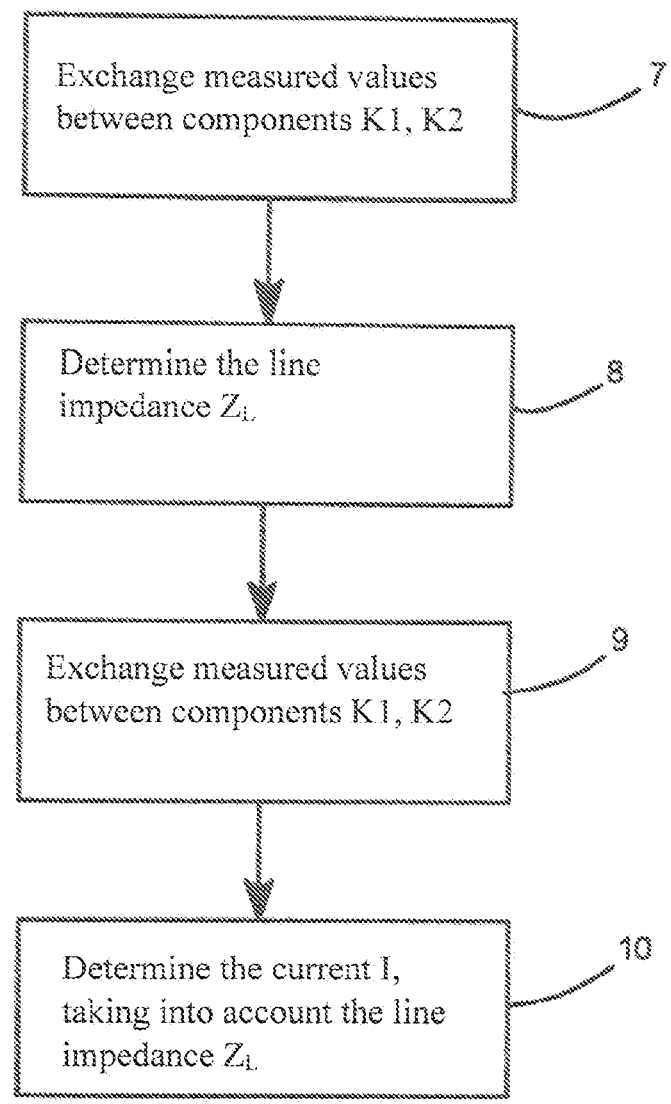

In the drawings:

FIG. 1 is a block circuit diagram of a grid branch having a plurality of components (supplies, loads) connected to different connection points, FIG. 2 is an equivalent circuit diagram of the grid branch, FIG. 3 is an equivalent circuit diagram at a connection point A1, and FIG. 4 is a flowchart for determining the grid status at connection point A1.

A grid branch 1 is connected to a parent grid 3 of a power grid via a transformer 2. In the grid branch 1, a plurality of components (supplies, loads) are connected at different connection points. A first component K1 is connected to the grid branch 1 at a connection point A1. A second component K2 is connected to the grid branch 1 at a connection point A2. Further components Kn are connected to the grid branch 1 at the connection points An. The components K1, K2, Kn are preferably loads, for example rechargeable batteries of electric vehicles.

The components K1, K2, Kn are respectively assigned grid branch control units N1, N2, Nn, by means of which a charging current or a charging power of the particular component can be controlled. The components K1, K2, Kn are thus controllable components, the charging power of which can be changed on the basis of the current grid status.

In addition, further components Km are arranged in the grid branch 1. These components Km are connected to the grid branch 1 via connection points Am. In contrast to the components K1, K2, Kn, the components Km are not assigned a grid branch control unit. These components Km are therefore not controllable.

The grid branch control units N1, N2, Nn are preferably integrated in the components K1, K2, Kn or form a common structural unit therewith or are arranged in a common housing together with the components K1, K2, Kn.

In principle, the components K1, K2, Kn, Km can be loads (e.g. rechargeable batteries of electric vehicles, heat pumps) or as supplies (photovoltaic systems, wind turbines, combined heat and power systems).

The grid branch control units N1, N2, Nn respectively assigned to the components K1, K2, Kn have the same configuration; the grid branch control unit N1 assigned to the first component K1 is shown in detail in FIG. 1 as an example. In the present embodiment, the grid branch control unit N1 is used to limit a load in the grid branch 1 since the component K1 is a load. The grid branch control unit N1 comprises a control device 4 for generating a control signal S1, by means of which a charging current I or a charging power drawn from the grid branch 1 is adjusted. The control signal S1 is generated in the control device 4 on the basis of the current grid status of the grid branch 1, the grid status being determined by a grid status determination device 5. The grid status determination unit 5 is configured to determine at least one physical parameter identifying the grid status. The following may serve as physical parameters: grid voltage, own current consumption, grid impedance, voltage angle change, etc.

Furthermore, the grid branch control unit N1 comprises a transmitting/receiving device 6 for transmitting and/or receiving data concerning the physical parameters and/or grid status data. The transmitting/receiving devices 6 of the respective controllable components K1, K2, Kn serve as communication means for exchanging data or measurement data between the grid branch control units N1, N2, Nn or the control devices 4 of the respective grid branch control units N1, N2, Nn. The current grid status can take place on the basis of the data exchanged by means of the transmitting/receiving device 6; for example, the corresponding measurement data from the connected components K1, K2, Kn is collected and evaluated in the control device 4 of the first grid branch control unit N1. The determined measurement data is evaluated in accordance with a grid branch optimization rule, or in the control device 4 of the first grid branch control unit N1, control data S1, S2, Sn is generated in accordance with the grid branch optimization rule and transmitted to the respective components K1, K2, Kn. The components K1, K2, Kn in the grid branch 1 are thus controlled in a decentralized manner by means of the grid branch control units N1 assigned to the components K1, K2, Kn. In the present embodiment, the grid branch control unit N1 assigned to the first component K1 serves as a master grid branch control unit N1 which generates the control signals S1, S2, Sn, while the other grid branch control units N1, Nn assigned to the controllable components K2, Kn provide slave grid branch control units N2, Nn which provide further measurement data, receive the control signals S2, Sn and apply said control signals in the components K2, Kn.

The grid status determination device 5 of the grid branch control units N1, N2, Nn may comprise, for example, a grid impedance determination device, by means of which a grid impedance $Z_g$ at the particular connection point A1, A2, An can be determined. For this purpose, two voltage measurements are taken in quick succession at different known load values for the particular component K1, K2, Kn. The determination of the grid impedance $Z_g$ is based on the understanding that the load voltage decreases as the load current increases, and that the gradient by which the load voltage decreases is proportional to the grid impedance $Z_g$ and independent of the grid voltage $U_N$. The grid impedance $Z_g$ is then obtained from the quotient of the voltage difference and the current difference between the two measurements.

Alternatively or additionally, the grid status determination device 4 may comprise a grid impedance determination device for determining the absolute grid impedance $Z_g$ over time. For this purpose, the mains impedance $Z_g$ is measured and recorded over a longer period of time, for example at least 24 hours. The highest occurring value is recorded as a reference load value $R_{ref}$ for the lowest load. For all further measurements, the reference value $R_{ref}$ is considered to be in parallel with the actual load impedances $R_{Last}$ and is subtracted from the measured value $R_{mess}$ according to the parallel connection of impedances. The following applies:

$$R_{Last}=1/(1/R_{mess}-1/R_{ref}).$$

Alternatively or additionally, the grid status determination unit 5 may comprise a voltage angle determination device, which provides for the determination of a cycle time T and a grid voltage $U_N$ at the particular connection point A1, A2, An in a time interval in which at least one load change occurs at the connection point.

If the load K1 changes abruptly, the phase position of the voltage U1 also changes abruptly. If this happens within one or two cycles of the grid frequency, these cycles are extended by the value of the phase angle change. A precise measurement of the cycle time thus allows abrupt load changes of this kind to be ascertained. By measuring the voltage curve U1 and the additional measurement of the cycle time T, it can be determined whether an abrupt voltage change has occurred due to a load change in the grid branch 1 being examined or due to a voltage change in the parent grid. A change in the voltage angle only occurs if the load current I in the grid branch in question changes. A change in the grid voltage $U_N$ in the parent grid will not cause a change in the phase angle of the voltage U1. It is thus possible to assign a change in load to an abrupt voltage change U1 if a brief lengthening or shortening of the cycle time T of the AC voltage occurs at the same time as the abrupt change. The voltage angle detection device thus has evaluation means by means of which abrupt changes in the cycle time T during the load change can be detected. In this way, abrupt load changes in the grid branch 1 and not in the parent grid can be detected.

Additionally or alternatively, the grid status determination device 5 may comprise a grid load device, the grid load being determinable by switching on the transmitting/receiving device 6 of a plurality of components K1, K2, Kn. In the present exemplary embodiment, the grid load is determined on the basis of the first component K1 and the second component K2. The determination of the grid load is explained in more detail below with reference to FIG. 4.

In a first step 7, measured values are exchanged between the first component K1 and the second component K2. The measured values are exchanged in an initialization phase in which the line impedance $Z_L$ between the connection points A1 and A2 is to be determined. Initially it is assumed that the components K1, K2 are switched off. In the grid status determination devices 5 of the grid branch control units N1, N2, the voltages $U_1$, $U2_2$ at the respective connection points A1, A2 are measured and stored as reference values. It is then agreed that only one of the two components K1, K2 is switched on, namely component K2. Subsequently, the voltages $U_1$, $U_2$ are measured at the respective connection points A1, A2, and then the voltage difference from each reference voltage is determined. The components K1, K2 exchange and compare these differential voltages. On the basis of the result, the positions of the two components K1, K2 relative to one another in the grid branch can be determined. If, for example, the voltage difference at the switched-on component K2 is greater, this means that an additional voltage difference $U_L$ occurs across the line $Z_L$ between the components K1, K2, and thus an additional current flow occurs between the connection point A1 and the connection point A2. From this it can be concluded that the switched-on component K2 is further away from the grid connection than the inactive component K1.

If the voltage differences are the same, but the two voltages U1, U2 are different, this means that no additional voltage difference occurs across the line between the components K1, K2, and thus no additional current flow occurs between the connection point A1 and the connection point A2. From this it can be concluded that the active component K2 is closer to the grid connection than the inactive component K1.

If the voltage differences $\Delta U_1$, $\Delta U_2$ are the same, but both voltages $U_1$, $U_2$ are also the same, this means that no additional load is connected beyond the component K2 or that both components K1, K2 are connected to the same connection point A1 or A2.

If no additional voltage drop is detected in the inactive first component K1, the first component K1 has a contact via the communication link with the grid branch 1, but is located in a different grid branch or on a different three-phase current phase. In this case, both components K1, K2 have to be considered as individual devices in the particular grid branch or phase thereof. In this variant, the method is ended.

If no additional voltage difference occurs, the first component K1 is then switched to active and the second component K2 is switched to inactive. In one of these two experiments, the voltage difference for the active component K1 or K2 should be greater than for the inactive component K1, K2.

In the present case, the active component K2 additionally measures its own power consumption and communicates this to the other component K1. The absolute value of the line impedance $Z_L$ can then be calculated directly from the additional voltage difference $\Delta U_L$ and the current $I_2$ of the component K2. According to Ohm's law, the line impedance $Z_L$ is obtained as follows:

$$Z_L = \Delta U_L / I_2.$$

In this way, the line impedance $Z_L$ is determined and stored in step 8.

The calculated line impedance $Z_L$ is stored and used to determine the grid load in the operating phase described below.

Accordingly, if this initialization phase is performed for more than two components K1, K2, the order of the components along the grid branch 1 can be determined unequivocally. Furthermore, the line impedances $Z_L$ between the particular connection points A1, A2, An of the components can be calculated.

In the operating phase, in a step 9, the grid voltages $U_1$, $U_2$ at the connection points A1, A2 are regularly measured at the same time and exchanged among the components K1, K2. From the voltage difference $\Delta U_L$ between the adjacent components K1, K2 and the determined line impedance $Z_L$ between the components K1, K2, the absolute value of the current I across the line between the components K1, K2 can then be calculated approximately according to Ohm's law in step 10:

$$I = \Delta U_L / Z_L$$

The calculation is only approximate because $\Delta U_L$ is calculated from the difference between the absolute values of the voltages $U_1$, $U_2$. For a precise calculation, it would be necessary to determine the difference between the complex voltages and to then use the absolute value thereof, but this is not necessary for a low-voltage grid.

The determined current I can then be used to reliably determine the grid load "behind" the first component K1. Since the current $I_1$ of the first component K1 is also known, the grid current $I_N$ in the supply line to the first component K1 can be determined. Only loads between the first component K1 and the grid connection cannot be taken into account.

On the basis of the determined grid load, the control signals S1, S2, Sn can then be determined in the master grid branch control unit N1 and directly transmitted to the first component K1 and onwards to the further components K2, Kn via the transmitting/receiving devices 6. The control signals S2, Sn are transmitted after authentication between the transmitting/receiving devices 6 of the corresponding components K1, K2, Kn such that the authenticity of the communication partners K1, K2, Kn is established. The transmitting/receiving devices 6 may be configured so as to communicate via the grid branch 1 or via a radio link. Advantageously, these two communication paths do not require any additional connections and connecting lines. Alternatively, communication between the transmitting/receiving devices 6 of the components K1, K2, Kn may be via a separate data link, e.g. fibre optic cable and/or e.g. an internet connection. For example, the transmitting/receiving devices 6 of the components K1, K2, Kn may communicate with one another via a (broadband data signal) modulated onto a power cable leading to the grid branch 1 (powerline communication PLC).

According to an alternative embodiment of the invention (not shown), the control signals S1, S2, Sn may also be generated in a central unit connected to the grid branch 1 or to the grid.

The invention claimed is:

1. An apparatus for controlling components in a grid branch (1) of an electrical power grid having a plurality of grid branch control units (N1, N2, Nn) for limiting a load in the grid branch (1), each grid branch control unit (N1, N2, Nn) containing a grid status determination device (5), via which at least one physical parameter characterizing a grid status of the grid branch (1) can be determined, and a control device (4) for generating a control signal (S1, S2, Sn), via which an electric current ($I_1$, $I_2$) between the grid branch (1) and a component (K1, K2, Kn) connected to a connection point (A1, A2, An) of said grid branch can be influenced on the basis of the grid status, wherein the components (K1, K2, Kn) are assigned communication means (6) for transmitting and/or receiving data, wherein the plurality of grid branch control units (N1, N2, Nn) are in communication with each other via corresponding communication interfaces and arranged so that any one of the grid branch control units (N1, N2, Nn) can be designated master grid branch control unit (N1) by the grid status determination device (5) in accordance with certain criteria and the remaining grid branch control units designated slave grid branch control units (N2, Nn), the master grid branch control unit (N1) collecting, assessing and evaluating the measurement data required for the generation of the control signals and generating from the evaluation result the control signal (S1) for the component (K1) connected to the master grid branch control unit (N1) and the control signals (S2, Sn) for the components (K2, Kn) connected to the slave grid branch control units (N2, Nn) on the basis of the detected grid status.

2. The apparatus according to claim 1, wherein the grid status determination device (5) has a grid impedance determination device for determining a grid impedance ($Z_g$), which provides for the determination of a reference of a reference load value ($R_{ref}$) during a predetermined reference period, the reference load value ($R_{ref}$) corresponding to the maximum value within the reference period, and which provides for the subtraction of the reference load value ($R_{ref}$) from a measured load value ($R_{mess}$) to determine the load value ($R_{Last}$).

3. The apparatus according to claim 1, wherein the grid status determination device (5) has a voltage angle determination device, which provides for the determination of a cycle time (T) and a grid voltage ($U_N$) at the connection point (A1) in a time interval in which at least one load change occurs at the connection point (A1), which provides evaluation means, by means of which abrupt changes in the cycle time (T) during the load change can be detected.

4. The apparatus according to claim 1, wherein at least two grid branch control units (N1, N2, Nn) are arranged having different components (K1, K2) and at different connection points (A1, A2) are configured in such a way that in an initialization phase, the grid branch control units (N1, N2, Nn) exchange and/or evaluate measured values, determined in accordance with a measurement rule, via the communication means (6) in order to determine the line impedance ($Z_L$), in an operating phase, the voltage ($U_1$, $U_2$) at the different connection points (A1, A2) is measured and exchanged via the communication means (6) and/or evaluated in one of the grid branch control units (5) in order to determine the current (I) between the different connection points (A1, A2), while taking into account the line impedance ($Z_L$) determined in the initialization phase.

5. The apparatus according to claim 1, wherein the control signal (S1, S2, Sn) comprises charging and/or supply power values.

6. The apparatus according to claim 1, wherein the communication means (6) comprises means for allowing the grid branch control units (N1, N2, Nn) of the grid branch (1) to authenticate one another.

7. The apparatus according to claim 1, wherein the components (K1, K2, Kn) communicating with one another are configured either as loads or as supplies.

8. An apparatus for controlling components in a grid branch (1) of an electrical power grid having a grid branch control unit (N1, N2, Nn) for limiting a load in the grid branch (1), the apparatus containing
    a grid status determination device (5), via which at least one physical parameter characterizing a grid status of the grid branch (1) can be determined, and
    a control device (4) for generating a control signal (S1, S2, Sn), via which an electric current ($I_1$, $I_2$) between the grid branch (1) and a component (K1, K2, Kn) connected to a connection point (A1, A2, An) of said grid branch can be influenced on the basis of the grid status,
    wherein the components (K1, K2, Kn) are assigned communication means (6) for transmitting and/or receiving data,
    wherein the control device (4) of at least one of the components (K1) evaluates the determined parameters of the plurality of components (K1, K2, Kn) and, on the basis of the evaluation result, generates the control signals (S1, S2, Sn) for the assigned components (K1, K2, Kn) of the same grid branch (1),
    wherein the grid status determination device (5) has a grid impedance determination device for determining a grid impedance ($Z_g$), which provides for the taking of two voltage measurements at different known load values at the same connection point (A1).

9. A method for controlling components (K1, K2, Kn) in a grid branch (1) of an electrical power grid, the grid branch (1) having a plurality of grid branch control units (N1, N2, Nn) each comprising a control device (4), a grid status determination device (5) and a communication means (6), the grid branch (1) having a plurality of connection points (A1, A2, An), the method comprising
    connecting a plurality of components (K1, K2, Kn) respectively to a plurality of connection points (A1, A2, An) of said grid branch (1),
    assigning communication means (6) for transmitting and/or receiving data to the components (K1, K2, Kn),
    connecting a plurality of grid branch control units (N1, N2, Nn) respectively to the plurality of connection points (A1, A2, An) of said grid branch (1),
    establishing communication interfaces whereby the plurality of grid branch control units (N1, N2, Nn) are in communication with each other,
    designating one of the grid branch control units (N1, N2, Nn) master grid branch control unit (N1) in accordance with certain criteria and designating the remaining grid branch control units slave grid branch control units (N2, Nn),
    determining measured values identifying a load on the grid branch (1) via the grid status determination device (5) of the master grid branch control unit (N1),
    evaluating in the control device (4) of the master grid branch control unit (N1) the determined parameters of the plurality of components (K1, K2, Kn) and, on the basis of the evaluation result, in accordance with a grid branch optimization rule, generating the control signal (S1) for adjusting a power consumption or power output for the component (K1) connected to the master grid branch control unit (N1) and the control signals (S2, Sn) for adjusting a power consumption or power output for the components (K2, Kn) connected to the slave grid branch control units (N2, Nn) on the basis of the detected grid status, via which electric current ($I_1$, $I_2$) between the grid branch (1) and components (K1, K2, Kn) connected to a connection point (A1, A2, An) of said grid branch are influenced on the basis of the grid status.

10. The method according to claim 9, wherein the control signals (S1, S2, Sn) are determined in a single grid branch control unit (N1) directly connected to a component (K1).

* * * * *